United States Patent [19]
Fultz

[11] Patent Number: 6,021,371
[45] Date of Patent: Feb. 1, 2000

[54] COMMUNICATION AND NAVIGATION SYSTEM INCORPORATING POSITION DETERMINATION

[75] Inventor: Robert B. Fultz, Boulder Creek, Calif.

[73] Assignee: Trimble Navigation Limited, Sunnyvale, Calif.

[21] Appl. No.: 08/840,816

[22] Filed: Apr. 16, 1997

[51] Int. Cl.[7] ................................ G06G 7/00; G01S 3/00
[52] U.S. Cl. .......................... 701/200; 701/207; 701/210; 701/23; 701/24; 340/988; 347/357.06; 347/357.08; 347/357.09
[58] Field of Search ................................ 701/200, 23, 24, 701/201–9, 207–12, 25, 210; 342/350, 357, 450, 454, 456, 7, 357.08, 357.09, 357.06; 340/988–995

[56] References Cited

U.S. PATENT DOCUMENTS

| | | | |
|---|---|---|---|
| 5,189,430 | 2/1993 | Yano et al. | 701/212 |
| 5,430,656 | 7/1995 | Dekel et al. | 701/200 |
| 5,793,631 | 8/1998 | Ito et al. | 701/210 |

Primary Examiner—William A. Cuchlinski, Jr.
Assistant Examiner—Yonel Beaulieu
Attorney, Agent, or Firm—Wagner, Murabito & Hao LLP

[57] ABSTRACT

A method and apparatus for providing navigation and information services. A mobile unit which includes a microphone and a speaker is used to communicate between a user and a service location. The service location includes a computer and data storage which includes data on geography, roads, road conditions, traffic and other data which may be of use to a user. The mobile unit includes a receiver and position determination processing circuitry for location determination. A user may obtain navigation information and routing information by pressing a button on the mobile unit so as to initiate communication with the service location. The user then verbally requests the information which he needs by speaking into the microphone. Using location data which is transmitted to the service location and the data in data storage, the computer compiles a response which is transmitted to the mobile unit and through the speaker for communication to the user. The response is stored in the mobile unit and may be reviewed manually. When the response includes voice based instructions, the voice based instructions may be incrementally broadcast to the user as required by the movement and position of the mobile unit so as to guide the user to a destination.

19 Claims, 9 Drawing Sheets

COMMUNICATION AND NAVIGATION SYSTEM INCORPORATING POSITION DETERMINATION

TECHNICAL FIELD

The present claimed invention relates to the field of navigation systems. More specifically, the present claimed invention relates to an improved in-vehicle navigation system.

BACKGROUND ART

A typical in-vehicle navigation system includes a receiver which receives position determination data from satellites, a microprocessor, a display and a map database. Typically, the position determination data is received from global positioning system (GPS) satellites which are a part of the GPS satellite network. The position determination data is processed via an electronics package located within the receiver or by the microprocessor unit. Most prior art in-vehicle navigation systems are self contained and do not interface with any outside sources other than the fact that they receive GPS data.

Other prior art systems such as the navigation system disclosed in U.S. Pat. No. 5,452,212 entitled "NAVIGATION SYSTEM FOR VEHICLE" involves the placement of numerous expensive components inside the vehicle. The '212 patent discloses a navigation system which includes a GPS receiver, data storage, an input section (touch screen), a display, a speaker system, and various other components which are located within the vehicle. The driver obtains information from a display screen which displays a whole route map and the names of the landmarks within the whole route map. Alternatively, the '212 system provides vocal instructions which are emitted by a speaker to the driver of a vehicle. In the '212 system, navigation information is generated within the vehicle from a database stored in a data storage section. The database includes geographical information, guide information about landmarks, data used to provide displays for guiding the driver, and other data. This system also includes a present position-location section which determines the present location of the vehicle from information received by GPS receiver and geographic information stored in data storage. In addition, the prior art '212 system includes a controller (arithmetic section) and a speech processor which translates information from the controller into analog signals so as to generate speech which is transmitted through speakers to the user. Hence, the prior art '212 system requires an extensive storage mechanism to store the geographical information, the landmark information, the speech generation program and the navigation data needed for calculating route data. As a result, prior art systems such as the '212 system are expensive and are difficult to maintain and operate. That is, each vehicle employing such a prior art system must maintain a complete and extensive database and an expensive microprocessor and speech processing system.

Additionally, in such prior art systems such as the '212 system, the data stored in each vehicle must be frequently updated to provide an effective navigation tool and the updating is expensive and time consuming. Even when data in this type of system is updated weekly or monthly, the system is not able to deal with current travel conditions such as weather conditions and temporary problems such as roadway repair, rush hour traffic, and traffic accidents. This is because these types of changes are unpredictable, quick, and transient. A road may be closed for repairs for the day, blocked by a fallen tree, or full of snow, and such changes are usually short lived. Thus, in order to fully meet the needs of a user, the navigation system needs the ability to change dynamically.

One prior art system which provides real time routing is disclosed in U.S. Pat. No. 5,177,685 entitled "AUTOMOBILE NAVIGATION SYSTEM USING REAL TIME SPOKEN DRIVING INSTRUCTIONS" which discloses the use of a computer (either installed in the automobile or accessed through a cellular car phone), input means, data storage (CD ROM), a vehicle location system, discourse generating programs and speech generating programs. The prior art '685 system further includes a map database and a route finding algorithm, both of which are stored in data storage. Based on the current position of the automobile and the route, the discourse generating programs compose driving instructions and other messages according to a discourse model in real time. The driver instructions and other messages are sent through a voice generator to the driver. The prior art '685 system uses CD ROM disks for storing data. CD ROM disks are a relatively inexpensive means for storing data and they are easy to install. Thus, storing the required data on the various geographic regions and updating the data is less burdensome for each in-vehicle computing system. However, the disks carried with each in-vehicle computing system should be frequently updated and old disks must be discarded. This results in additional recurring costs which may be quite significant. In addition, whenever a user having an in-vehicle computing system desires to travel into a region other than the region in which they normally travel, they must purchase a new disk or set of disks for each new region.

In-vehicle computing systems such as the '685 system are expensive to manufacture and keep updated, particularly when numerous in-vehicle databases must be continuously updated for changes to conditions. The burden of the updating requirement is particularly apparent when one considers that on any given day numerous events transpire in each city and region. In order to keep an in-vehicle system updated such that the vehicle could travel across a country, thousands of changes must be input on a daily basis into the vehicle. This requirement is particularly burdensome in light of the fact that most users only are traveling locally and they do not need to use the updated information occurring in other cities and states. In fact, particularly in large cities and major metropolitan areas, the user does not require all of the information updates in their particular city since they may not be planning to travel to a particular neighborhood or part of the city to which the update pertains. Therefore, most of the updated information which is stored in the navigation system is never used and if it is used, it is used infrequently. Thus, because the cost of keeping each system updated is high, and because most of the updated data is not used on a daily basis, such a prior art system is not cost effective.

The prior art '685 system which accesses a computer via cellular phone is expensive to operate since the cellular car phone line must remain open in order to transfer real time location data to the computer and must remain open to relay real time instructions from the computer to the user. Also, since each user must maintain his own cellular phone line, many phone lines must be kept open simultaneously. Additional expense is incurred because the location housing the computer must maintain an extensive number of dedicated phone lines and information from each phone line must be constantly monitored and processed by the computer. The '685 system would be particularly expensive for users driving long distances since the user may not need instructions for hours at a time.

However, in order for a vehicle communication and navigation system to be truly effective, the user must have access to other information and services. For example, the '685 system also discloses the use of the vehicle navigation system for locating a parking lot and discloses that the system could automatically call a parking garage by phone or radio to reserve a space. Using prior art methods to store information regarding these types of service and the updating of those services on particular navigation system computers located on individual vehicles requires more data storage than is currently available in portable computer systems and CD ROM drives. Thus, the cost of such a system is prohibitive.

What is needed is a way to provide a user with navigation and other services on a cost effective basis without the need to update numerous individual in-vehicle databases with superfluous information. In particular, what is needed is a vehicle navigation system which includes inexpensive in-vehicle components; a system which is easy to operate; a system which allows for cost effective installation, maintenance and updating of data; and a system which provides needed data on a real time basis. More specifically, a vehicle navigation system which includes a location determination system and which will reliably operate in a variety of locations without the need to manually update an extensive map database inside the vehicle is required. In addition, a vehicle navigation system which draws from a database which receives updated information on a real time basis and which may be easily kept current is required.

DISCLOSURE OF THE INVENTION

The present invention meets the above need with a vehicle navigation system which includes a mobile unit which communicates with one or more service locations. The mobile unit includes a position determination system which uses radio transmissions from GPS satellites to determine the location of the vehicle, a communication system, a system for storing voice-based instructions, and a speaker. Map database maintenance, updating and instruction processing is performed at a central service location and is communicated to the vehicle via the communication system. The central service location is comprised of a single base station or multiple base stations. In addition, services may be provided by auxiliary service providers such as emergency medical services.

A mobile unit which includes a vehicle position determination system, which uses a position determination system such as the constellation of GPS satellites to determine the location of the vehicle. The mobile unit includes a communication system which includes a microphone. The user may contact a service provider by pressing a button on the mobile unit. The user may then request information by voice. The user's request is input into a database at the service location and the needed information is transmitted directly back to the user via the communication system, either as voice, data or both depending on the user's equipment. For voice, the information is received as a voice recording which is stored in either a tape storage device or in a digital storage device. The user receives only the information which he needs to meet the particular request. With respect to navigation information, only the navigation information which is on or near the planned travel path of the user needs to be transmitted to the mobile unit. In addition, only that information which pertains to the conditions during the anticipated duration of the trip needs to be transmitted. Thus, the present invention eliminates the need to transfer information to the user which does not pertain to the user's needs at the time of the request. The information conveyed to the user is broadcast to the user over a speaker. However, the user has the option of either reviewing the information as it is transmitted or the user may store the information for later retrieval. Stored information may be reviewed and repeated as the user desires using control buttons located on the mobile unit. In addition, the information may be tagged with flags and location data such that relevant segments of the information may be disseminated to the user as the user approaches certain way points or locations where actions such as turns and stops are to be taken.

There is no need to store massive amounts of map data in each vehicle as is required by prior art systems. In addition, since the communication link is closed after the required data is transferred, communication services are much less expensive than systems which require the communication link to be kept open during the entire duration of the trip. Furthermore, since the verbal information received is simply recorded and played back, there is no need for complex speech processing systems such as expensive speech synthesis systems which would require advanced microprocessors, extensive data storage capabilities and associated hardware and software. The resulting mobile unit is inexpensive and simple to use and operate. The information received by the user may be updated by the user or the service location as needed. Therefore, the user has no requirement to update any map database or install any new hardware when traveling to different regions as is required by prior art systems.

The service location may be easily updated and kept current on road conditions, weather, traffic, and other changing conditions and events. In addition, the service location may easily add other services and features which may be made available to users without the need to update a each mobile unit for each new service. Since only the database at the service location needs to be updated, there is no need to manufacture CD ROMs or any other type of data storage devices each time there is an update, thus resulting in significant cost savings. In addition, since a centralized database is used, there is no need for multiple in-vehicle programs for route selection and data processing, resulting in further cost savings. In addition, since the data processing capabilities and the memory requirements of each vehicle is less than the requirements of prior art systems, mobile units which are quite inexpensive may be used without limiting the services available to each user.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
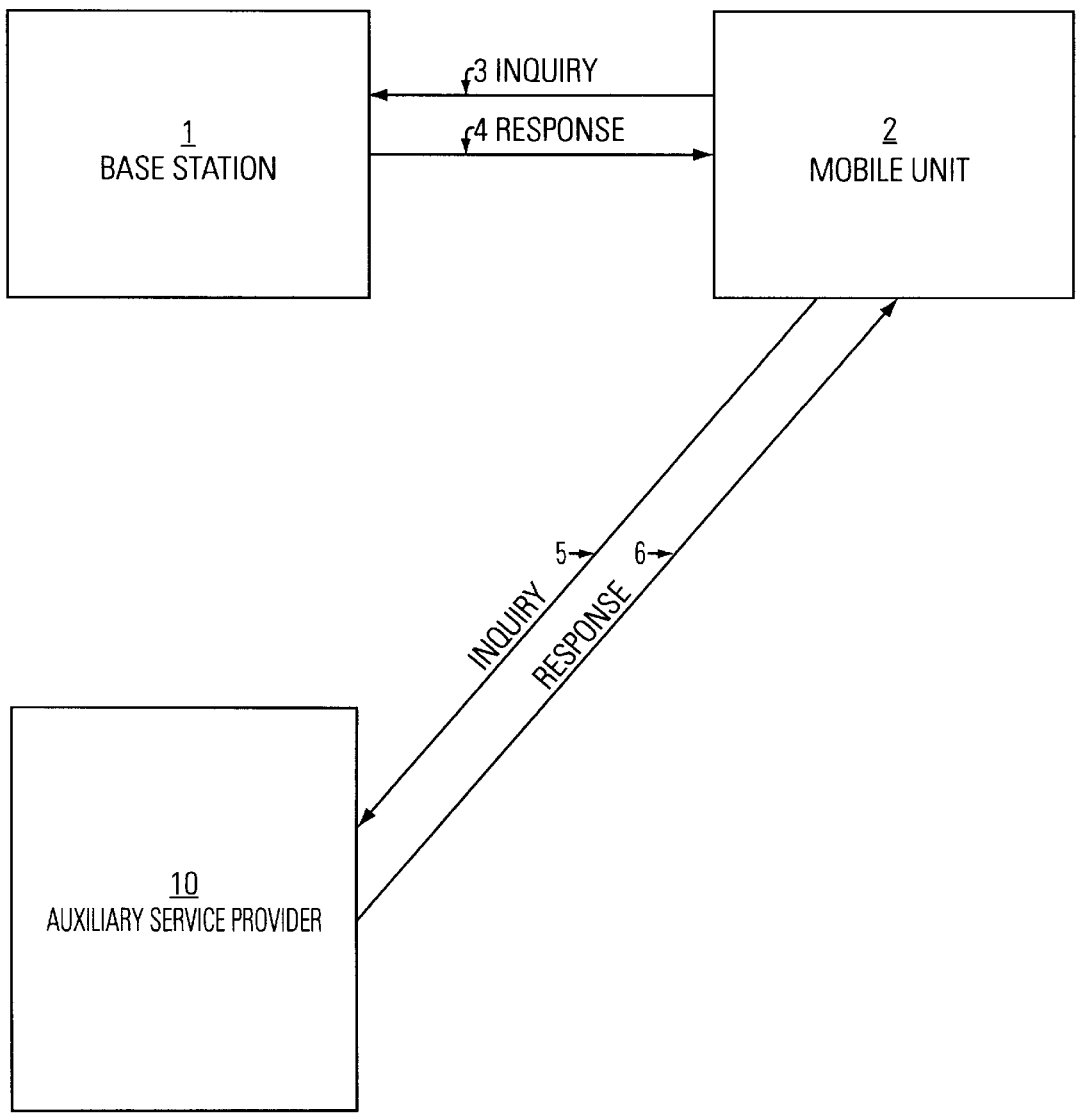
FIG. 1 is a diagram illustrating communication between a mobile unit and a base station and an auxiliary service provider in accordance with the present invention.

FIG. 1 shows navigation and information system 100 in accordance with one embodiment of the present invention. System 100 includes a service location which is base station 1. Mobile unit 2 can be used to transmit an inquiry to base station 1 as illustrated by arrow 3. The inquiry may be a request for specific travel information such as vehicle routing information between two points or it may pertain to other specific needs such as emergency assistance or general information. General information can include the location of roadside services such as restaurants and gas stations, and it can be as specific as locating an address or a phone number from the yellow pages. As shown by arrow 4 the requested information is then transmitted from base station 1 to mobile unit 2. Inquires or requests for service may also be transmitted to an auxiliary service provider such as auxiliary service provider 10. Auxiliary service provider 10 may be a community service such as an emergency medical service or any of a number of other different services. As shown by arrow 5, an inquiry is transmitted directly to auxiliary service provider 10 from mobile unit 2.

Referring to FIG. 1, auxiliary service provider 10 responds to the inquiry or request as shown by arrow 6 by communicating directly with mobile unit 2. The response includes verbal instructions which may be issued personally by an operator. Alternatively, depending on the number of requests for a particular item of information and the complexity of the particular item of information, messages which include prerecorded segments which include digitized speech could be used. Cellular communication services are preferably used for communication, however, trunk radio or any of a number of other communication methods could also be used. One advantage to the use of cellular services for communication is that significant price discounts are available since each mobile unit is restricted to calling only those numbers to which inquiries are directly dialed. Therefore, pricing can be much lower than for unrestricted cellular communications services which are not limited in the amount of different numbers with which they can communicate.

Inquiries, represented by arrows 3 and 5 includes location data which gives the location of the mobile unit. This location data may be transmitted in the background, as blank and burst sequential data segments, or over a separate communication channel. The location data, coupled with the users request allows the requested information to be easily provided to mobile unit 2 without the user having to give his location verbally to the base station 1. This feature is particularly useful in emergency situations and when the user does not know his exact location.

Location data is obtained by a receiver which receives position determination data from satellites of the US Global Positioning System (GPS). The receiver is coupled to position signal processing circuitry which determines the location of the receiver by analysis of the position determination data using methods well known in the art. Although satellites of the US Global Positioning System are preferably used to obtain location, any of a number of other systems such as GLONASS or LORAN could also be used.

When required, response data, illustrated by arrows 4 and 6 includes voice based instructions and may include encoded data. This encoded data may be transmitted in the background on the same channel as voice data either simultaneously with voice data or separately. Alternatively, encoded data may be transmitted on a second communication channel. Encoded data may be as simple as the location of the landmarks or "waypoints" along the route or it may include navigation information, maps and other information. Preferably the voice based instructions and encoded data is transmitted in a digital form such that it may be easily stored and retrieved. The voice based instructions are transmitted in a recording and playback type of format such that there is no need to regenerate the audible sounds by any type of voice synthesizer such as is required by prior art systems. Therefore, the voice based instructions may be "played" or audibly broadcast through speakers (not shown) so as to communicate the response to the user of the mobile unit.

Figure 2:
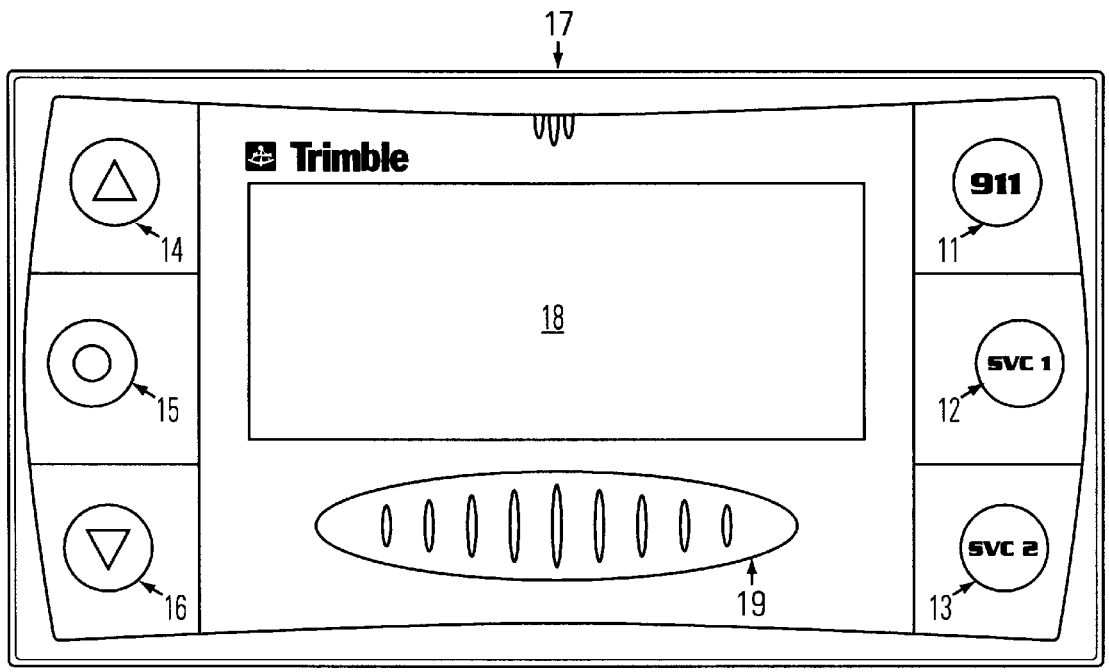
FIG. 2 is a front view of a mobile unit including a display and a speaker in accordance with the present invention.

FIG. 2 shows mobile unit 2 to include microphone 17 and speaker 19 for communication with the user. Communication buttons 11–13 allow the user to select communication with the base station and with auxiliary service providers. In this embodiment, local emergency medical services may be selected by pressing communication button 11 and the base station may be selected by pressing communication buttons 12 and 13. Each of communication buttons 12–13 allows for communications to different numbers at a particular base station. Communication buttons 12 and 13 may be used to access the same service. Alternatively, each of communication buttons 12 and 13 may allow for access to a separate service offered by the base station. For example, when both communication buttons 12 and 13 are used to access the same service, communication buttons 12 could be used as for primary contact with the base station and communication button 13 could be used for communication when services through communication button 12 are busy. When different services are offered by pressing button 12 as opposed to pressing communications button 13, each button communicates to a separate service group at the base station.

Referring to FIG. 2, Control buttons 14–16 allow the user to audibly scroll through stored information. Pressing control button 14 plays stored information while control button 15 stops the playing of stored information. Control button 16 allows the user to scroll backwards through stored information. In addition to the communication of information audibly, information may be displayed visibly on display 18. In an attempt to minimize the cost of mobile unit 2 it is anticipated that only basic information which does not require complex and expensive processing capabilities is displayed on display 18 in the present embodiment. This information may be as basic as the map coordinates of the location of the vehicle. However, display 18 can also display a map of the route and may show the location of the vehicle within the map. Display 18, depending on the processing capabilities of the particular unit, may also display the users location as he moves toward his destination and may present a map which is modified as the user progresses towards his destination. In addition, display 18 may include a touch screen for input. Furthermore, display 18 is able to display detailed information pertaining to a particular response to an inquiry such as written directions, instructions, or other information. When a touch screen is used, other functions such as direct dialing of numbers is possible through displaying a display including a keypad including numbers such as a standard 12-key keypad.

Figure 3:
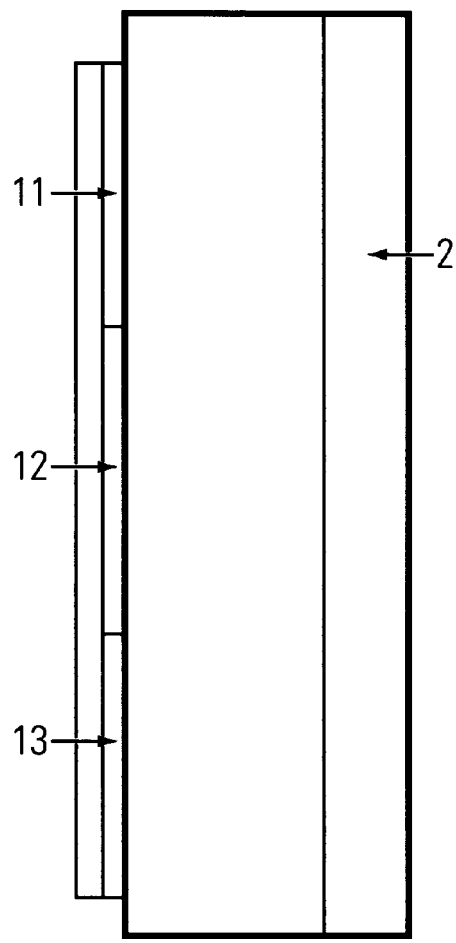
FIG. 3 is a side view of the mobile unit in accordance with the present invention.

Referring to FIG. 3, it can be seen that the side profile of mobile unit 2 is minimized so as to make mobile unit 2 easy to install and easy to integrate into the passenger compartment of a vehicle. Communication buttons 11–13 are sized as large as possible given the size of mobile unit 2 so that the user may easily press communication buttons 11–13 while driving with minimal interference with driving activities. In this embodiment, the communication system is integrated into mobile unit 2. Connection receptacles are located on the back of mobile unit 2 (not shown) for power input and communication system connectivity. Communication system connectivity is provided so that alternate communication utilities may be coupled to mobile unit 2. In addition, because of the small size of mobile unit 2, it may be desirable to use an external antenna which may also be coupled to the connection receptacles.

Figure 4:
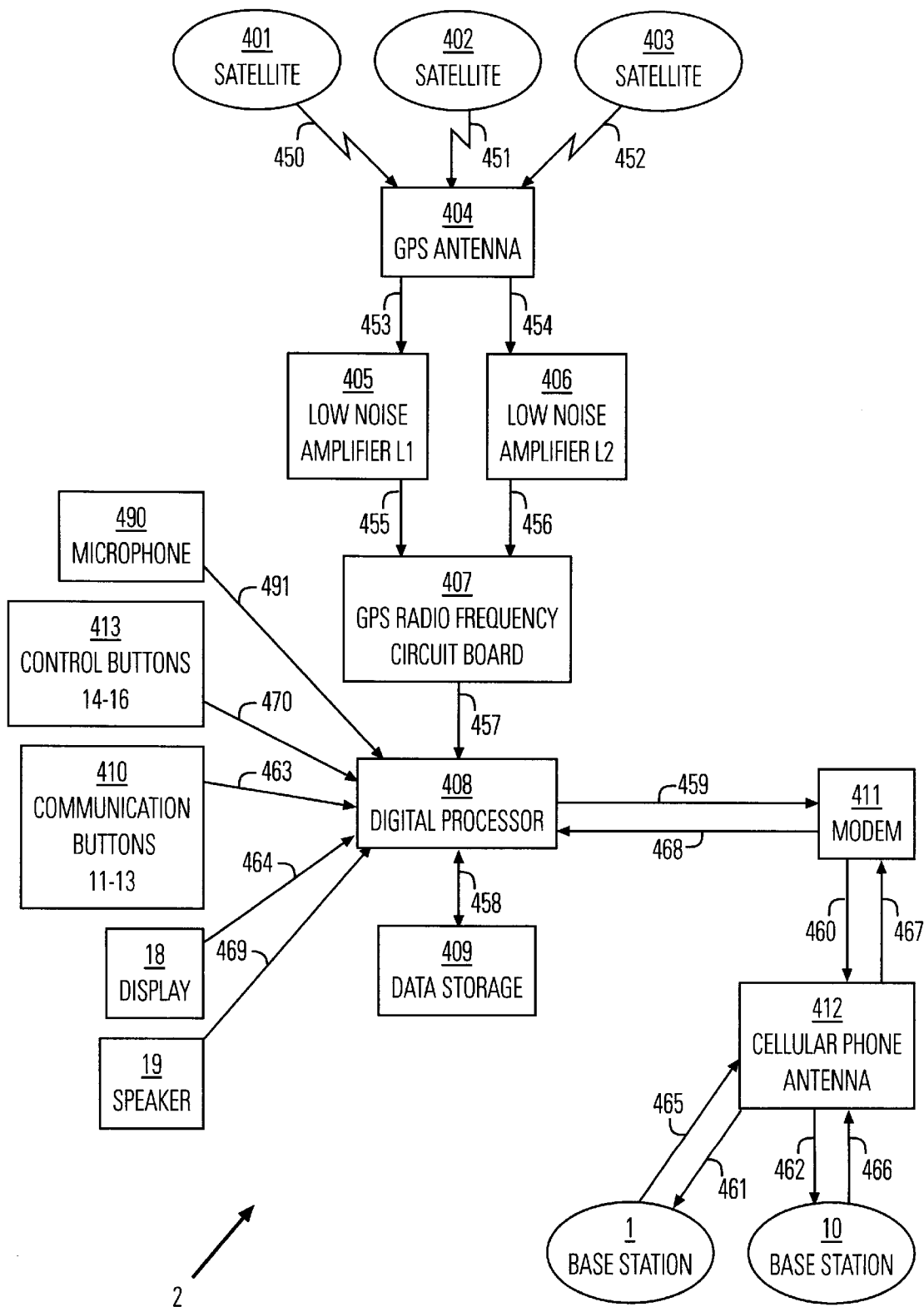
FIG. 4 is a diagram illustrating the components of the mobile unit in accordance with the present invention.

FIG. 4 shows a diagram which includes GPS antenna 404. GPS antenna 404 receives data broadcast from satellites such as satellite 401, satellite 402, and satellite 403. Signals from satellites 401–403 are broadcast on two separate frequencies, each of which are received by antenna 404. Signals received on one frequency, designated as L1, are transmitted, as shown by arrow 453 to low noise amplifier 405. Signals received on the second frequency, designated as L2, are transmitted, as shown by arrow 454 to low noise amplifier 406. Though the present invention is described with reference to a system that receives and processes signals from both L1 and L2, both frequencies are not required (L1 may be used exclusively) unless the system is used for military applications. Low noise amplifiers 405–406 amplify the incoming radio signals and transmit the amplified signals to GPS radio frequency circuit board 407, as illustrated by arrows 455–456. GPS radio frequency circuit board 407 demodulates the radio signals and transmits the signals to digital processor 408. Location information indicating the location of the vehicle is determined using the ephemerides received from satellites 401–403 by digital processor 408.

Continuing with FIG. 4, when one of communications buttons 11–13, shown by block 410, are selected, an inquiry is initiated as shown by arrow 463. The inquiry is processed through digital processor 408 which connects to modem 411, as shown by arrow 459. Modem 411 initiates a call through cellular phone and antenna 412 as shown by arrow 460. Depending on which communication button is pressed, a call is initiated to either base station 1, as illustrated by arrow 461, or to an auxiliary service provider such as auxiliary service provider 10, as shown by arrow 462. Microphone 490 connects to digital processor 408 to allow for the user's voice instructions to be transmitted, as shown by arrow 491, to digital processor 408 and through modem 411 and cellular phone and antenna 412 to either base station 1 or auxiliary service provider 10.

FIG. 4 shows responses received by cellular phone antenna 412, as shown by arrows 465–466, to be coupled through modem 411 to digital processor 408 as shown by arrows 467–468. Voice communication and digital data is stored in data storage 409 as shown by arrow 458. Alternatively, the audio portion of responses may be recorded on a simple tape recording device or a dedicated digital recording and playback device. In response to the selection of control buttons 14–16, illustrated by block 413, as shown by arrow 470, voice communication may be played and replayed through speaker 19 as shown by arrow 469. In addition, information may be displayed by display 18 as shown by arrow 464. Using the digital data, digital processor 408 may periodically compare the position indicated by satellite 401–403 with data flags included in the digital data. When the calculated location of the vehicle corresponds to the location indicated by a data flag, a segment of the voice data may then be played through speaker 19, as indicated by arrow 469.

Figure 5:
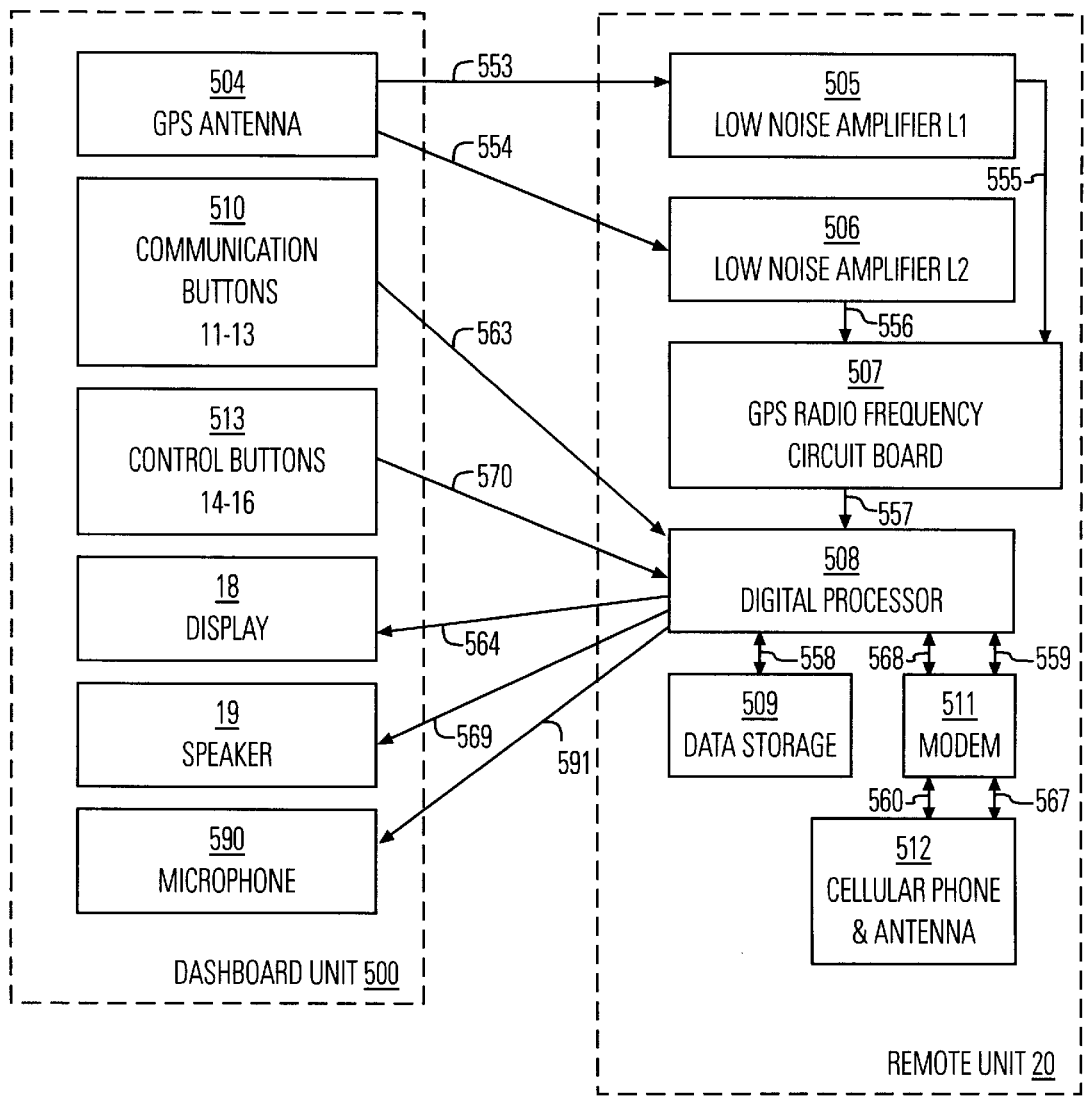
FIG. 5 is a diagram illustrating a second embodiment in accordance with the present invention.

FIG. 5 is a block diagram of a second embodiment in which most of the electronic components of mobile unit 2 are placed in remote unit 20. Remote unit 20 is in the form of a box which may be placed into the trunk or back seat of the vehicle. Remote unit 20 is shown to house low noise amplifier 505 and low noise amplifier 506 as well as GPS radio frequency circuit board 507. Signals received by low noise amplifiers 505–506 are amplified and transmitted to GPS radio frequency circuit board 507 as shown by arrows 555–556. The signals are then processed by GPS radio frequency circuit board and are transmitted to digital processor 508, as shown by arrow 557. Digital processor 508 is coupled to data storage 509, as shown by arrow 558, for storage and retrieval of data. Communications are processed through modem 511 and cellular phone and antenna 512 as illustrated by arrows 559–560 and 567–568.

Continuing with FIG. 5, processing circuitry necessary for communication, determining position, and data storage is located within remote unit 20. This is done to minimize the size and complexity of dashboard unit 500. By minimizing the size of dashboard unit 500, a design which is easily integrated into the passenger area of the vehicle is obtained. In addition, since dashboard unit 500 is visible, theft is a likely problem. Therefore, the replacement cost of dashboard unit 500 is minimized by placing all possible components in remote unit 20. Dashboard unit 500 could either be mounted on top of the dashboard or it could be inserted into a opening in the dashboard designed to receive electronic components such as radios and CD players. Alternatively, dashboard unit 500 could be integrated into one or more of the dashboard mounted components. For example, the functions of dashboard unit 500 could be integrated into an AM/FM radio, a CD player, a tape player or a DVD player or into a component that is a combination AM/FM radio, CD player, tape player and DVD player.

Continuing with FIG. 5, dashboard unit 500 includes GPS antenna 504 and communication buttons 11–13, illustrated by block 510 as well as control buttons 14–15, shown by block 513. Display 18, speaker 19 and microphone 590 are included in dashboard unit 500. A cable connects dashboard unit 500 with remote unit 20. Radio signals received by GPS antenna 504 are transmitted to low noise amplifiers 505–506 as shown by arrows 553 and 554. Upon the selection of communication buttons 11–13, shown by block 510, electrical signals are transmitted to digital processor 508 as shown by arrow 563 which indicate that communication is to be initiated. Similarly, upon the selection of control buttons 14–16, shown by blocks 513, electrical signals are transmitted to digital processor 508 as shown by arrow 570. Digital processor 508 transmits data to display 18 and transmits voiced based instructions and information to speaker 19 of dashboard unit 500, as shown by arrows 564 and 569. Microphone 590 connects to digital processor 508 to allow for the user's voice instructions to be transmitted through modem 511 and cellular phone and antenna 512. In the event that the installation of dashboard 500 shields GPS antenna 504, a remote GPS antenna may be coupled to remote unit 20 for better reception of GPS signals. In addition, auxiliary communication systems such as trunk radio circuitry or other processing circuitry could be located in remote unit 20. In fact, to make theft of the highly visible and accessible dashboard unit 500 less advantageous, it is desirable to minimize the amount of electronics located within dashboard unit 500 and mazimize the amount of electronics located in remote unit 20.

Figure 6:
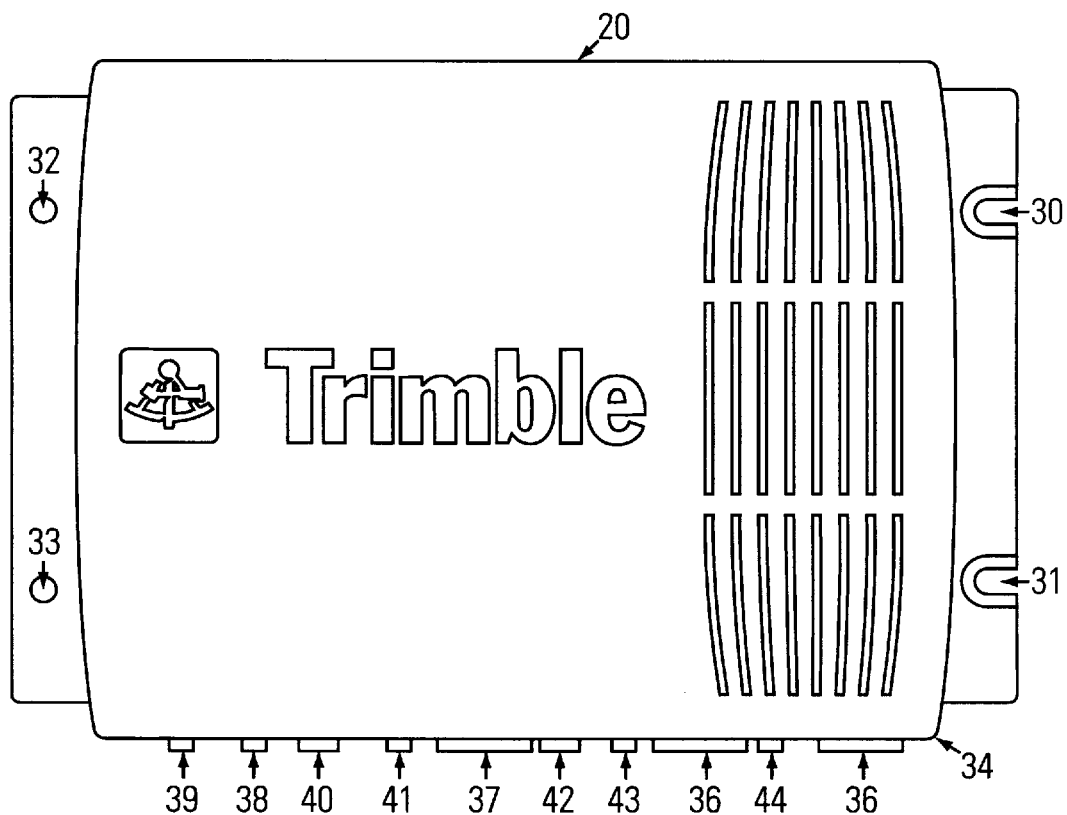
FIG. 6 is a top view of a remote unit in accordance with the second embodiment of the present invention.

FIG. 6 shows a top view of remote unit 20. Port 35 allows for the connection of an external antenna to remote unit 20. Thus, remote GPS antennas and/or remote cellular telephone antennas may be coupled to remote unit 20. Connection between remote unit 20 and mobile unit 2 is through port 36. Port 37 allows for connection to other devices and utilities such as personal computers and other electronic devices. Telephone coupling 40 allows for connection between remote unit 20 and other communication utilities such as modems or other cellular telephones. Additional connectivity is provided by receptacles 38–39 which allow audio output to be coupled to other electronic devices. For example, receptacles 38–39 could be used to drive external speakers. Threaded openings 41–44 allow for connectors to be secured to remote unit 20 by screws which engage threaded openings 41–44.

Continuing with FIG. 6, remote unit 20 includes mounting openings 30–33 for securing remote unit 20 to a vehicle. Typically, screws are used to mount remote unit 20 to the vehicle, and the screws engage mounting openings 30–33 to secure remote unit 20 to the vehicle. Slotted openings 34 are provided in the top of remote unit 20 so as to allow air to circulate for the purpose of cooling the electronic components within remote unit 20. Alternatively, heat sinks could be used to facilitate cooling of electronic components.

Figure 7:
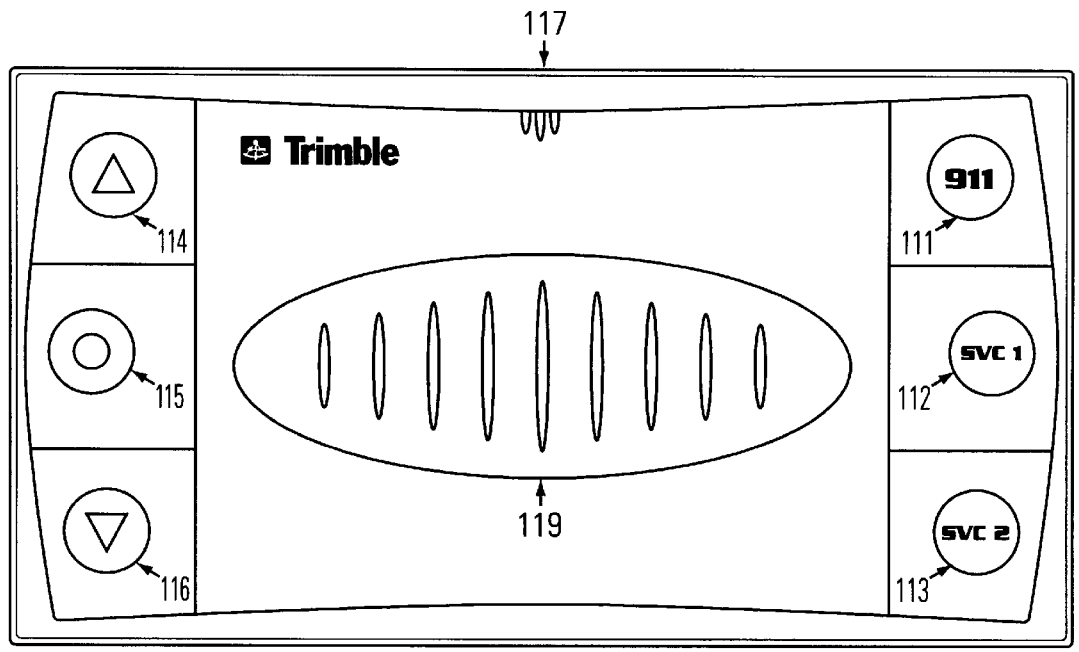
FIG. 7 is a front view of a third embodiment in which the mobile unit does not include a display in accordance with the present invention.

FIG. 7 illustrates a third embodiment which does not contain a display. In this embodiment, communication with the user is by voice. Microphone 117 receives voice input from the user and output to the user is through speaker 119. Control buttons 114–116 allow the user to audibly scroll through stored information. Pressing control button 114 plays output and pressing control button 115 stops the playing of output. Control button 116 allows the user to move backward through the stored data to replay earlier output. As discussed in the first embodiment, the voice data may be navigation data between landmarks, between waypoints, between cities, or directions to a restaurant. In addition, the data could be as complex as the user desires. For example, information as complex as the names of the movies playing at nearby cinemas may be stored. Alternatively, more complex information could be stored such as the menus of different area restaurants or the directions to the different area restaurants.

Continuing with FIG. 7, control button 111 contacts a emergency assistance service (911) and control button 112 links the driver to a base station where the user can access navigation data and other resources. Control button 113 links the driver to a second auxiliary service provider which is a roadside assistance and local information service. Additional buttons could be added for additional auxiliary services or for specific additional services to be performed by the base station. By altering the services provided and the number of control buttons, and hence the number of access numbers, the base station operators and auxiliary service providers may effectively optimize personnel, computing, and communication resources.

Figure 8:
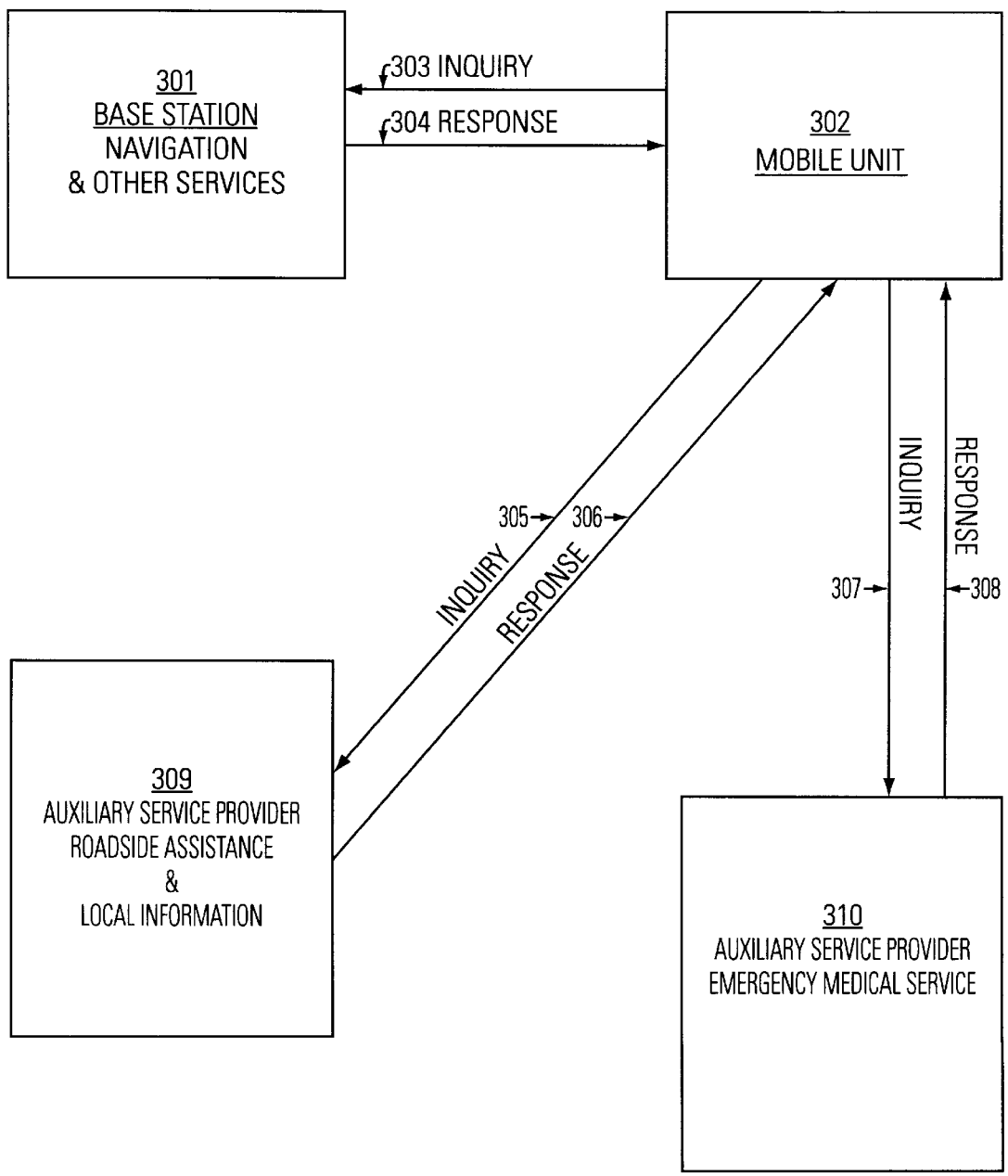
FIG. 8 is a diagram of a third embodiment in accordance with the present invention.

FIG. 8 is a diagram illustrating the third embodiment and showing auxiliary service provider 310 to provide emergency medical services. Additional auxiliary services are provided by auxiliary service provider 309 that provides services such as roadside assistance and local information independently of base station 301. In operation, a user at mobile unit 302 could communicate with base station 301 by pressing communication button 112 shown in FIG. 7 in order to initiate an inquiry as shown by arrow 303. The user could verbally request navigational information in the form of a "trip ticket" from his current position to a desired destination. The inquiry would include information regarding the position and direction of travel of mobile unit 302 transmitted digitally in the background or at the beginning or end of the communication. The base station 301 would issue a response as indicated by arrow 304 which would include a voice response and encoded data. The voice response could include voice based instructions and the encoded data could include flags which separate individual phrases contained in the voice based instructions and encoded data in the form of digital data indicating the location corresponding to each flag. The voice data could be transmitted in real time by an operator using his own voice, or the voice data could consist of prerecorded segments and/or computer generated text which is processed through a voice synthesizer located at base station 301. The encoded data could also include map data and other information which may be visually displayed on mobile units having visual displays such as display 18 illustrated in FIG. 2. Alternatively, the user could communicate with auxiliary service 309 as shown by arrow 305 by pressing communication button 113 shown in FIG. 7. The user could verbally request roadside assistance and local information from auxiliary service 309. Along with voice communication, the location of mobile unit 302 is also transmitted to auxiliary service 309.

Continuing with FIG. 8, using the location and direction information received from mobile unit 302, the auxiliary service provider 309 responds as indicated by arrow 306 by either notifying mobile unit 302 that roadside assistance has been dispatched or by transmitting local information to mobile unit 302. With respect to local information, such information would include navigation information where appropriate which may include voice based instructions and encoded data including digital location data corresponding to encoded flags so that the user may easily find the requested location by scrolling through the navigation information manually or by having mobile unit 302 direct the user using the position of the vehicle to determine when to audibly indicate travel directions such as, for example, "turn right here" or "exit here" or "get into the right hand lane and take your next exit". Alternatively, the user could press communication button 111 shown in FIG. 7 to communicate with auxiliary service provider 310 and the user could submit an inquiry as shown by arrow 307 for emergency medical services to be provided. The location and direction of travel of mobile unit 302 will be transmitted to the emergency medical provider enabling them to dispatch the appropriate medical unit. Auxiliary service provider 310 may send a response indicating that emergency medical services are on their way and may also provide immediate emergency medical procedures which are to be performed. Response 308 could also include information as to the location and estimated time of arrival of the dispatched medical unit either by voice or by encoded data transferred in the background digitally. The encoded data could be used in conjunction with mobile units having visual displays to indicate the location of the mobile unit and the dispatched medical unit on a map display.

Figure 9:
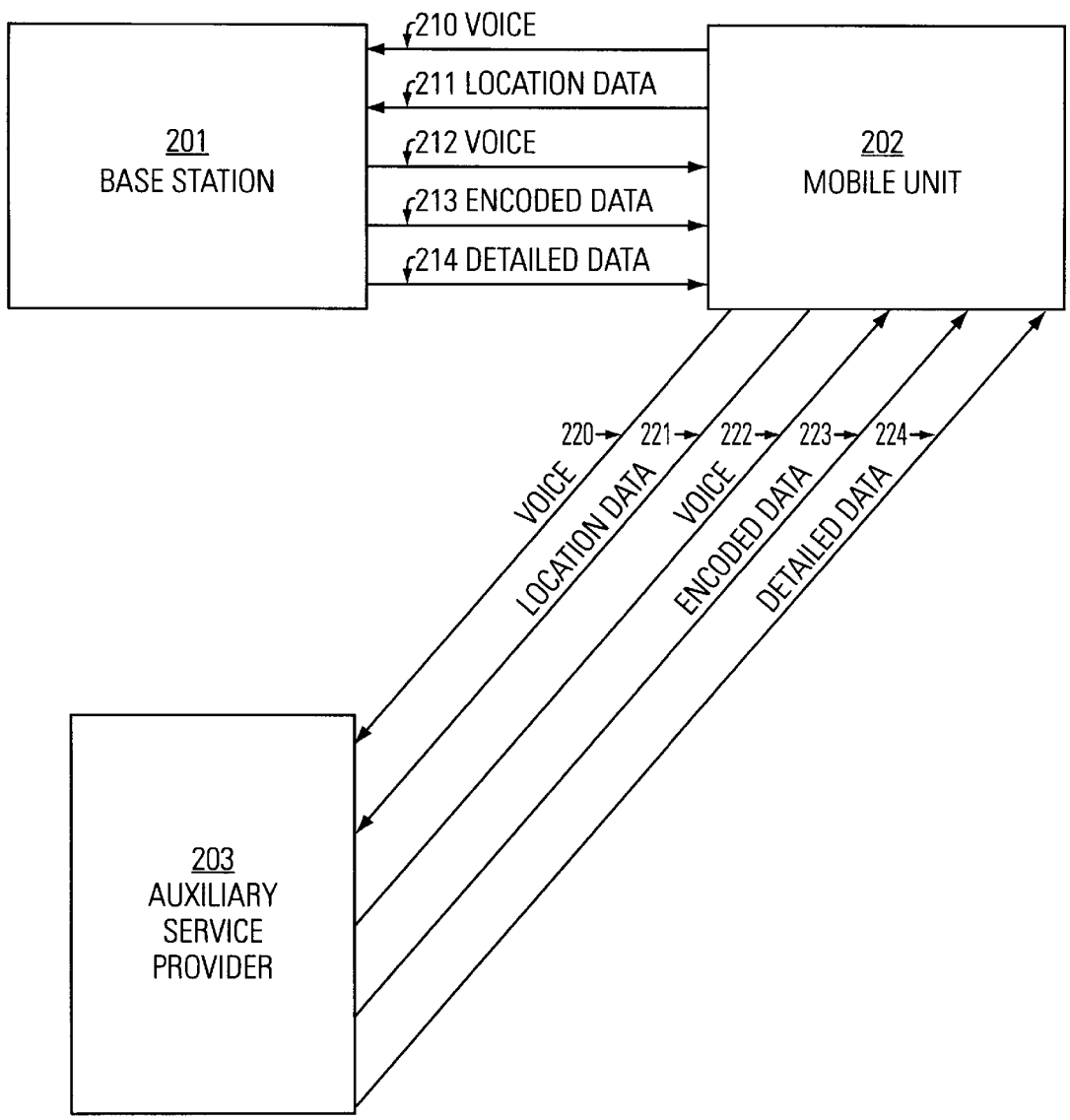
FIG. 9 is a diagram of a fourth embodiment in accordance with the present invention.

FIG. 9 shows a fourth embodiment in which detailed data 214 is transmitted between base station 201 and mobile unit 202 in addition to voice communication 212 and encoded data 213. As in the first two embodiments, inquiries include both voice communication and location data as shown by arrows 210–211. Transmissions from auxiliary service providers such as auxiliary service provider 203 also contain detailed data 224 in addition to voice communication 222 and encoded data 223. As in the first two embodiments, inquiries include both voice communication 220 and location data 221.

As described in the first three embodiments, encoded data, illustrated by arrows 213, 223 may be as simple as flags indicating pauses in voice data and the location of corresponding landmarks along the route and map coordinates corresponding to each flag. Alternatively, encoded data 212, 223 may be more comprehensive. For example, encoded data 212, 223 could include mapping data for display and information such as the names of different Chinese restaurants in the area. Detailed data 214, 224 is data which pertains to an item of encoded data 213, 223 but includes additional details. For example, detailed data 214, 224 could include additional information on each Chinese restaurant listed in encoded data 213, 223. Detailed data 214, 224 is not communicated to the user unless it is specifically requested by the user. Detailed data may be accessed by the user either by using a combination of control buttons 14–16, 114–116 illustrated in the first two embodiments or by a separate dedicated button which may be engaged while an item of voice data or encoded data is currently selected. In operation, a user could be scrolling through the different Chinese restaurants using control buttons 14–16 (not shown) or 114–116 (not shown) and the user could press the stop button twice in quick succession during the transmission of the name of a Chinese restaurant to access detailed information on the particular Chinese restaurant. Different configurations of service packages may use some or all of the different levels of data represented by voice data 212, 222 encoded data 213, 223 and detailed data 214, 224. Information may be sent and received between the base station and auxiliary service providers such that auxiliary service providers and base station have current information. Alternatively, communications between the user and either the base station or the auxiliary service provider could generate a data transfer between the base station and the auxiliary service provider such that there is no need to store information in more than one location.

By using a mobile unit which is less expensive and which is of a simple, easy to use design, cost effective services may be provided to users which take full advantage of current position determination system capabilities and mapping, routing and information service capabilities. Since data is stored and updated at a base station or a number of different base stations and auxiliary service providers located at fixed locations, data may be easily stored and updated in a centralized manner. In addition, since the mobile units do not require complex voice synthesis features, and routing algorithms, and since the user does not have to constantly update information which he may not need, significant cost savings is achieved. Furthermore, since compiling of data is performed at centralized service locations, simpler, less complex and less costly communications processing devices may be used in remote units. Thus, in accordance with the present invention users may obtain real-time data easily and cost effectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An integrated navigation and information system comprising:

a computing device located at a service location including data storage and voice synthesis logic such that said computing device for computing travel routes and respond to data inquiries by assembling appropriate data from said data storage to generate voice based instructions;

a communication system for coupling communications between a mobile unit and said service location, said communication system includes names for coupling inquiries to said computing device for transmitting said voice based instructions to a mobile unit;

a receiver disposed within said mobile unit for receiving signals from satellites;

position signal processing circuitry disposed within said mobile unit and coupled to said receiver for analyzing position determining signals so as to determine the position of said receiver, said position signal processing circuitry coupled to said communication system for coupling said position of said receiver to said service location;

a speaker coupled to said communication system for communicating information received from said service location to a user; and a communication processing device coupled to said position signal processing circuitry, coupled to said communication system, and coupled to said speaker, for storing information including said voice based instructions and encoded data such that, upon the movement of said mobile unit to locations corresponding to said encoded data, said voice based instructions are incrementally transmitted by said speaker.

2. The integrated navigation and information system of claim 1 wherein said communication processing device further comprises:

a processor including memory storage, said processor storing said voice based instructions received from said service location, said processor incrementally transmitting said voice based instructions to said speaker for communication to said user and for transmitting said voice based instructions sequentially as indicated by digital flags keyed to route waypoints; said transmission occurring as said vehicle approaches route waypoints.

3. The integrated navigation and information system of claim 1 further comprising:

a plurality of control buttons for manually scrolling through said voice based instructions such that said voice based instructions are manually scrolled through by pressing said control buttons.

4. The integrated navigation and information system of claim 1 wherein said communication system transmits the position of said receiver upon each transmission from said mobile unit to said service location.

5. The integrated navigation and information system of claim 4 wherein said computing device includes logic for generating encoded data corresponding to location data and voice based instructions such that, upon changes in the position of said receiver, said voice based instructions are incrementally transmitted through said speaker to said user.

6. The integrated navigation and information system of claim 1 wherein said computing device compiles data in response to an inquiry so as to generate a response which includes general data.

7. The integrated navigation and information system of claim 6 further comprising a display coupled to said communication processing device for display of said voice based instructions and said general data.

8. The integrated navigation and information system of claim 7 further comprising:

a communication button coupled to said communication system for initiating communication between said user and said service location such that, upon pressing said communication button, a call is initiated to said service location.

9. The integrated navigation and information system of claim 8 further comprising a second communication button coupled to said communication system for initiating communication between said user and a service location operated by an auxiliary service provider.

10. The integrated navigation and information system of claim 7 wherein said communication processing device is integrated into a component located in the dashboard of an automobile and wherein said component includes an AM/FM radio.

11. A method for providing navigation and information services comprising:

storing data in a computing device located at a service location;

sending an inquiry from a mobile unit to said service location, said inquiry including data indicating the location of said mobile unit;

inputting said inquiry into said computing device;

compiling said stored data in response to said inquiry so as to generate a response including voice based instructions at said service location;

sending said response from said service location to said mobile unit, said response including encoded data;

storing said response within said mobile unit; and communicating said response to a user using a speaker located in said mobile unit, said voice based instructions incrementally communicated to said user as indicated by said encoded data.

12. The method for providing navigation and information services of claim 11 wherein said response includes general data.

13. The method for providing navigation and information services of claim 11 wherein said step of sending an inquiry from a mobile unit to said service location further comprises the steps of:

pressing a button located in said mobile unit; and speaking an inquiry into a speaker located in said mobile unit.

14. The method for providing navigation and information services of claim 13 wherein said mobile unit includes a cellular communication system such that said step of pressing a button located in said mobile unit creates a cellular communications link between said user and said service location such that said user communicates said inquiry to said service location by speaking said inquiry into said speaker.

15. The method for providing navigation and information services of claim 11 wherein said step of inputting said inquiry into said computing device is done manually by an operator.

16. The method for providing navigation and information services of claim 11 wherein said step of inputting said inquiry into said computing device is done by voice recognition software located in said computing device.

17. The method for providing navigation and information services of claim 11 wherein said response includes general data including a plurality of general data items and detailed data, said detailed data corresponding to each of said general data items such that said user obtains detailed data on each of said general data items.

18. An integrated navigation and information system comprising:

a receiver disposed within a mobile unit for receiving signals from satellites;

position signal processing circuitry disposed within said mobile unit and coupled to said receiver for analyzing position determining signals so as to determine the position of said receiver;

a plurality of communication buttons disposed within said mobile unit;

a cellular communication device disposed within said mobile unit and coupled to said position signal processing circuitry and said communication buttons such that, upon the manual operation of said communication buttons by said user, a cellular communications link is established between a user and a service location;

a microphone disposed within said mobile unit and connected to said cellular communications device such that said user submits an inquiry to said service location by speaking said inquiry into said microphone;

a computing device located at a service location having cellular communication equipment and data storage, said data storage containing data such that, upon receiving an inquiry from a mobile unit, said computing device computing a travel route and encoded data;

a voice generating device located at said service location and coupled to said computing device for generating voice based instructions corresponding to said travel route;

a cellular communications device located at said service location for transmitting said voice based instructions and said encoded data to said mobile unit;

a data storage device disposed within said mobile unit for storing said voice based instructions and said encoded data received from said service location;

a plurality of control buttons disposed within said mobile unit;

a communication processing device disposed within said mobile unit for incrementally transmitting said voice based instructions to a speaker for communication to said user upon the manual operation of said control buttons by said user.

19. The integrated navigation and information system of claim 18 wherein said plurality of communication buttons are disposed in a component located in the dashboard of a vehicle, said component capable of functioning as an AM/FM radio.

* * * * *